United States Patent [19]

Mondt et al.

[11] 4,193,902

[45] Mar. 18, 1980

[54] FINELY PARTICULATE PLASTICS DISPERSIONS PREPARED BY METERING A MIXTURE CONTAINING FOUR MONOMERS INTO AN AQUEOUS LIQUOR CONTAINING AN ANIONIC EMULSIFIER

[75] Inventors: Josef Mondt, Königstein; Karl J. Rauterkus, Kelkheim; Helmut Rinno, Lorsbach, all of Fed. Rep. of Germany

[73] Assignee: Hoechst Aktiengesellschaft, Frankfurt am Main, Fed. Rep. of Germany

[21] Appl. No.: 866,836

[22] Filed: Jan. 4, 1978

Related U.S. Application Data

[63] Continuation of Ser. No. 749,440, Dec. 10, 1976, abandoned.

[30] Foreign Application Priority Data

Dec. 13, 1975 [DE] Fed. Rep. of Germany ....... 2556327

[51] Int. Cl.$^2$ ............................................. C08L 33/08
[52] U.S. Cl. .............................. 260/29.6 TA; 526/80; 526/81
[58] Field of Search .................. 260/29.6 TA; 526/80, 526/81

[56] References Cited

U.S. PATENT DOCUMENTS

| 3,242,121 | 3/1966 | Hill ............................... 260/29.6 TA |
| 3,326,836 | 6/1967 | Snyder .......................... 260/29.6 TA |
| 3,458,466 | 7/1969 | Lee ................................ 260/29.6 TA |
| 3,634,298 | 1/1972 | Wamsley et al. ............. 260/29.6 TA |
| 3,962,197 | 6/1976 | Khanna ..................................... 526/80 |
| 4,089,999 | 5/1978 | Mondt et al. ................. 260/29.6 TA |

FOREIGN PATENT DOCUMENTS

1055239  4/1959  Fed. Rep. of Germany .
842672  7/1960  United Kingdom .

*Primary Examiner*—Maurice J. Welsh
*Attorney, Agent, or Firm*—Curtis, Morris & Safford

[57] ABSTRACT

A process is described by which plastics dispersions of high water and saponification resistance are obtained which, due to their small average particle size diameter of 0.01 to 0.06 microns are especially useful as primers for porous substrates. In their penetration characteristics, the present dispersions can be compared with conventional solvent-based primers at comparable solids content. The dispersions are obtained in a one-step polymerization process.

2 Claims, No Drawings

FINELY PARTICULATE PLASTICS DISPERSIONS PREPARED BY METERING A MIXTURE CONTAINING FOUR MONOMERS INTO AN AQUEOUS LIQUOR CONTAINING AN ANIONIC EMULSIFIER

This is a continuation of application Ser. No. 749,440 filed Dec. 10, 1976, now abandoned.

Primers for preparing and consolidating a substrate for subsequent coatings must meet the following requirements:

The binder has to penetrate the substrate thoroughly to ensure its good consolidating after drying and to reduce its absorptive power. The primer thus has to form a good base coat for the subsequent paint layers, and it must be resistant to water, saponification and atmospheric influence. Solvent-containing primers, which hitherto have met these requirements solely, have various disadvantages. The solvent content is dangerous for physiological reasons and because of th fire hazard; the tools employed have to be cleaned with solvents; the molecular weight of the binder has to be maintained within a determined range since, at high molecular weight, the viscosity of the primers is too high and does not allow a high binder concentration.

In contrast to solvent containing primers, aqueous plastics dispersions are most advantageous. They do not contain flammable or physiologically detrimental solvents, the tools used may be cleaned with water, and above all, such dispersions, at a high molecular weight of the binder, may contain a large amount of solids without having to cope with an excessive viscosity. Moreover, residual amounts of water in a paint coating dry easier and more rapidly than solvent residues. Furthermore, provided that their emulsifier/protective colloid systems are compatible, plastics dispersions may be blended in more ways, so that the scope of properties may be widely varied by such mixtures of different dispersions.

Despite the obvious advantages, aqueous systems have not made their way as primers in the practice. Although water-soluble binders penetrate the substrate thoroughly, they are insufficiently water resistant and/or stable to saponification. When the monomers and the emulsifier/protective colloid system is adequately chosen, plastics dispersions give coatings that are stable to water and saponification; however, their depth of penetration is insufficient for consolidating and sealing the substrate. As has been observed in the copolymerization of optically brightening monomers, the hitherto used dispersions scarcely penetrate cavities and capillaries of the substrate at all because of their large average particle diameter, and they do form practically no more than a film on the surface.

German Patent Specification No. 1,925,353 proposes a two-step process according to which vinyl ester copolymer dispersions having particle sizes of less than $0.2\mu$ are obtained. However, the polymers described are not sufficiently stable to water and saponification, and the two-step manufacturing process is complicated.

It has now been found that plastics dispersions having an average particle diameter of from about 0.01 to $0.06\mu$ are obtained which yield thoroughly penetrating primers stable to water and saponification, when a monomer mixture containing I. from 20 to 80% of styrene and/or methyl methacrylate as hardening component II. from 20 to 80% of an acrylic acid ester with linear or branched alcohols having from 2 to 8 carbon atoms and/or a methacrylic acid ester with linear or branched alcohols having from 4 to 8 carbon atoms as plasticizing component, III. optionally small amounts of $\alpha,\beta$-unsaturated compounds copolymerizable with I and II, IV. optionally and preferably from 0.1 to 5% of an amide of an $\alpha,\beta$-unsaturated carboxylic acid, and V. optionally and preferably from 0.1 to 5% of an $\alpha,\beta$-unsaturated monocarboxylic acid is introduced in the form of the pure monomer mixture or a preliminary emulsion, simultaneously with an initiator, into an aqueous liquor containing an anionic emulsifier in such an amount that the solids content of the final dispersion does not exceed 45% by weight, and polymerized therein.

The present invention furthermore relates to the plastics dispersions obtained according to the above process.

The monomers have to be selected according to the rules known to those skilled in the art in such a manner that stable dispersions are obtained and that the film-forming temperatures of the copolymers are in the range known to be favorable for the coating technique, that is, advantageously from about $-10°$ to $+25°$ C.

As hardening component, it is particularly advantageous to use styrene alone. When methylmethacrylate is employed, its amount should not exceed 15% by weight, relative to the total amount of monomers.

Examples of the plasticizing component are ethylacrylate, propylacrylate, isopropylacrylate and the acrylic or methacrylic acid esters of butyl alcohol and 2-ethylhexyl alcohol.

To modify the properties ot the copolymer, further $\alpha,\beta$-unsaturated copolymerizable monomers such as acrylonitrile, hydroxyethyl-methacrylate, hydroxypropyl-methacrylate, vinyl toluene or vinyl xylene may be concomitantly used.

Amides of unsaturated carboxylic acids, especially acrylamide or methacrylamide, promote the formation of finely distributed dispersions, when they are added to the batch during the polymerization simultaneously with the other monomers. Their concomittant use is not compulsory; however, it favors the desired fine distribution of the copolymer, so that a preferred embodiment of the invention provides the concomittant use of from 0.1 to 5% by weight, and especially from 1.5 to 3.5% by weight, relative to the total amount of monomers of acrylamide or methacrylamide as comonomer.

Incorporation of unsaturated monocarboxylic acids into the copolymer increases the stability of the dispersion during its manufacture, storage and application. Acrylic and methacrylic acid in amounts of from 0.1 to 5% by weight, relative to the total amount of monomers, are preferred examples.

On the other hand it has to be taken into consideration that the amides of group IV and the carboxylic acids of group V, being hydrophilic monomers, increase the hydrophilic nature of the total molecule. In order not to reduce the water resistance of the primer coats and other coatings obtained with the use of the dispersions of the invention to a too large extent, the total amount of the cited monomers should be in a range of from 0.2 to 8.5% by weight. Within these limits, the amount of hydrophilic material may be higher with higher contents of hydrophobic monomers of groups I to III, that is, it may touch the upper limit of the cited range of 0.2 to 8.5% by weight when the other monomers are especially hydrophobic such as styrene, butylacrylate, 2-ethylhexylacrylate or 2-ethylhexylmethacrylate, and near the lower limit when the other monomers are less hydrophobic such as methylmethacrylate, ethylacrylate, acrylonitrile or the hydroxyalkylacrylates.

As hardening monomer of group I, styrene alone is preferably used. Methylmethacrylate may be employed in a maximum amount of 15% by weight, relative to the total amounts of monomers.

When choosing the kind and amount of monomers of group III, it has to be taken into consideration that they do not adversely affect the stability to water and saponification of the resulting copolymer.

Examples of suitable monomer combinations are the following (parts by weight):

| Monomers | Parts by Weight |
| --- | --- |
| Butylacrylate | 40 to 80 |
| Styrene | 60 to 15 |
| Acrylic acid, methacrylic acid or mixtures thereof | 0.1 to 4.0 |
| Acrylamide, methacrylamide or mixtures thereof | 0.1 to 4.0 |
| 2-Ethylhexylacrylate | 30 to 80 |
| Styrene | 65 to 10 |
| Acrylic acid, methacrylic acid or mixtures thereof | 0.1 to 4.0 |
| Acrylamide, methacrylamide or mixtures thereof | 0.1 to 4.0 |
| 2-Ethylhexylacrylate | 30 to 80 |
| Methylmethacrylate | 65 to 15 |
| Acrylic acid, methacrylic acid or mixtures thereof | 0.1 to 4.0 |
| Acrylamide, methacrylamide or mixtures thereof | 0.1 to 4.0 |
| Butylacrylate | 40 to 80 |
| Methylmethacrylate | 55 to 15 |
| Acrylic acid, methacrylic acid or mixtures thereof | 0.1 to 3 |
| Acrylamide, methacrylamide or mixtures thereof | 0.1 to 3 |

The polymerization must be performed in the presence of an anionic emulsifier, for example, alkali metal salts of sulfuric acid semi-esters of alkyl-phenols or alcohols, which may be oxethylated; alkyl or aryl sulfonates.

Preferred anionic emulsifiers are alkali metal salts of sulfuric acid semi-esters of a nonyl phenol reacted with from 4 to 5 moles of ethylene oxide; sodium lauryl sulfate, sodium lauryl ethoxylate sulfate containing from 2 to 5 moles of ethylene oxide; sodium dodecylbenzene sulfonate and secondary sodium alkane sulfonates having from 8 to 20 carbon atoms in the carbon chain.

The amount of anionic emulsifier may be from 0.5 to 10% by weight, preferably from 2 to 8% by weight, relative to the total monomers. Generally, an increase of the amount of anionic emulsifier used brings about a decrease of particle size.

In order to increase the stability of the dispersions, nonionic emulsifiers, such as ethoxylated alkylphenols or fatty alcohols, for example, nonylphenols having from 4 to 30 mols of ethylene oxide may be employed in addition and in admixture with the anionic emulsifier. When selecting the emulsifiers and monomers to be used as well as the preparation process, care has to be taken that dispersions are obtained which do not tend to formation of aggregates either after manufacture or after dilution with water, since formation of larger aggregates may decrease the penetrating power when the finely distributed plastics dispersions are used for impregnation and primer coating.

Suitable initiators are the usual inorganic per-compounds such as ammonium persulfate, potassium persulfate, sodium persulfate, or organic peroxides such as benzoyl peroxide, organic peresters such as perisopivalate. Advantageously the initiators also comprise a reducing agent such as sodium bisulfite, hydrazine, or hydroxylamine. It is preferable to use, in addition to the initiators, catalytic quantities of accelerators such as salts of iron, cobalt, cerium and/or vanadium; preference is given to the use of alkali or ammonium peroxidisulfates.

The polymerization temperature may be from 10° to 100° C., preferably from 30° to 90° C.

The solids content of the dispersions is from 20 to 45%, after their manufacture.

It is advantageous for the preparation of the dispersions having an especially fine particle size according to the invention when the polymerization is carried out at low solids concentration, since reduction of the solids concentration generally gives finely particulate dispersions. As Table 1 shows, latices containing coarser particles have less penetrating power and less consolidating effect than the finely particulate dispersions. In the case where finely distributed dispersions contain an amount of coarser particles because of a broad distribution of particle sizes, the coarser particles do not impart a consolidating effect and a good penetrating power to the dispersion. Therefore, plastics dispersions having a narrow distribution of particle sizes are a preferred embodiment of the present invention.

After polymerization, the pH of the finely particulate dispersions is adjusted to a pH of from 7 to 10, preferably from 7.5 to 9, by means of alkali, ammonia or amines. When dispersions having a low solids content are obtained, this solids content may be increased by vacuum distillation without adversely affecting the extraordinary fine distribution of the dispersions.

The polymerization may be carried out as follows: from 30-50% of the water and from 20-50% of the anionic emulsifier together with from 10-50% of the non-ionic emulsifier are precharged. A preliminary emulsion is prepared from the monomers, the remaining part of water and the rest of emulsifiers, and is metered during 1 to 3 hours into the liquor formed from the water and emulsifier which has been heated to 50°-90° C. The quantitative ratio of monomers to water is chosen in such a manner that the resulting dispersion contains from 20 to 45% of solids.

The amount of anionic emulsifier has to be in a range of from 2 to 8%, relative to the monomers, depending on the solids content intended.

The reaction batch is then stirred, and, after termination of the feed, the whole batch is stirred for another 1–3 hours at a temperature of from 70° to 90° C. The initiator is preferably added as a 1 to 5 percent aqueous solution during the addition of the emulsion. Subsequently, the pH is adjusted to 7.5 to 9 by means of ammonia, aliphatic amines or alkali metal hydroxides.

The addition of the monomer emulsion is not essential for preparing the plastics dispersions having fine particle sizes: they may also be obtained by metering the monomer mixture into a liquor containing all the water and the emulsifiers. When plastics dispersions are to be used for primer coatings and impregnation, the solids content of the dispersions has a decisive influence on the penetrating depth, the consolidating effect and the reduction of absorptive power of the treated substrates.

Dilute dispersions penetrate deeper into the substrate pores than concentrated dispersions. When using concentrated dispersions, only some of the latex particles penetrate into the substrate pores, the others forming a film on the substrate surface.

Therefore, on application, cncentrated dispersions reduce the absorption of the substrate to a very high degree, while dilute dispersions have only a small reducing effect on the absorption of the substrate.

The consolidating effect depends both on the nature of the polymer and on the amount of polymer per unit area of the treated surface. Although dilute dispersions penetrate deeply into the substrate, the amount of plastics material per unit area is relatively low. In the case of concentrated dispersions, that part of the polymer which remains on the surface after drying does not contribute to the consolidating of deeper layers.

It is therefore possible to adjust the ratio of penetrating depth, consolidating and sealing of the surface, and to adapt these parameters to the various substrates encountered in practice by a corresponding choice of the solids content. Using the dispersions of the invention, good results are obtained at solids amounts of from 5 to 25% by weight, preferably from 10 to 20% by weight. An advantage of the dispersions of the invention resides in the fact that within a relatively wide concentration range an especially favorable ratio of good penetrating depth and good consolidating can be obtained by a high specific plastics amount in the treated surface, when the latex particles have a mean particle size of from 0.01 to 0.06 microns (determination of the particle size according to the light scattering method and electron microscopy).

As is current practice for dispersion paints, auxiliaries may be added. Examples of such auxiliaries are solvents for improving film formation and for lowering the film-forming temperature, plasticizers, defoamers, preservatives, surface-active substances for improving wetting, and pigments or soluble dyestuffs for tinting.

The degree of penetration may be tested by different methods. The material to be submitted to such a test may for example be applied to the chosen substrate, for example, by brushing, pouring or dropping. After drying, the penetrated material may then be identified by inspection of its cross section. If dissolved resins are used, they may be colored by soluble dyestuffs. This method can however lead to spurious results, when the aqueous phase is colored simultaneously. Since the aqueous phase of most dispersions penetrates deeper than the latex particles, the colored zone of the cross section may not correspond to the actual penetration of the particles.

In order to prove the improved penetration of the dispersions of the invention, copolymer dispersions containing optical brighteners were prepared by copolymerization with vinyl-sulfonyl-pyrazoline-brighteners at concentrations of from 0.01-0.05% (based on the monomers). The polymers so prepared contained in their latex particle a random distribution of brightener molecules as structural units, all over the macromolecule, and so the optical brightener could not be extracted from the polymer. The polymer is therefore located in the substrate exactly where the optical brightener shows the characteristic fluorescence under UV radiation. The copolymer dispersions containing optical brighteners and having fine particle sizes were applied onto a number of substrates such as wooden plates, calcareous sandstone, plaster plates, plastering lime, plastering concrete, filler coating, unglazed clay plates, porous concrete, brick etc. The dry specimens were checked under UV radiation and the depth of their penetration measured on the planes of a section.

Other methods for determining the penetration of the polymer are also known. One suitable method consists, for example of burning off a plane section of coated or impregnated substrate with a bunsen burner, the polymer being distinguished by a grey discoloration. Sections of acid-resistant substrates may also be coated with concentrated sulfuric acid in order to identify the penetration of the polymer. These experiments showed that the finely distributed plastics dispersions of the invention, at the same solids content, penetrate to the same depth and consolidate as well as known binders in solvent-containing systems, and that the penetration depth and degree of consolidation was much greater than that of dispersions with comparable polymer structure and average particle size diameters of more than 0.06 $\mu$m.

The superiority of dispersions having particle sizes of less than 0.06 $\mu$m was proved especially by the fact that at relatively high solids contents of, for example, from 15 to 20 percent by weight which allow the application of a large amount of plastic material per unit area in one single operation, the finely distributed dispersions still penetrate almost completely into the substrate, where they contribute to consolidation and improved anchorage for subsequent paint coatings. Dispersions having larger particle sizes do not penetrate into the substrate to a substantial extent, but merely form a film on the surface.

A further test permits a study to be made not only of the penetration of the dispersion but also of the degree of consolidation obtained from a certain quantity of binder, by reacting the dispersion with fine-grained, loose material. This method also has the advantage that the material produces a compound of the grained material in the penetration zone after drying. The solidified core can be easily removed and weighed. Its weight is a reference for measuring the penetrating ability and the consolidating effect. This test simulates, for example, the consolidating of surface of old, weather-beaten construction parts.

For performing the test, flat receptacles were filled with quartz powder (average analysis: 50% <40 microns). Where the material was to be submitted to the test, a hemispherical groove having a diameter of 2.5 cm was formed bysing a stamp. 2 ml of the dispersion was dropped into this groove, and after having allowed the filling layer to dry at room temperature for four hours, it was placed in a drying cabinet at 50° C. for another 15 hours. The results of these tests are shown in Table 1. The tests were carried out on plastics dispersions according to the invention having particle sizes from 0.01 to 0.06 $\mu$m, which were prepared according to the Examples 1 to 6.

Dispersions having particle size D>0.08 microns were tested for comparison, these dispersions being based on various monomer systems and commercial polymers in organic solvents which are recommended for penetrative primer coatings.

The results of the tests show that the highest core weight and thus the best penetrating ability combined with a high degree of consolidation is obtained with dispersions according to the invention and with the polymer solutions in organic solvents (Table 1); the results obtained from aqueous plastics dispersions having larger average particle diameters /D>0.1 consolidation) being clearly inferior to those achieved with the finely distributed dispersions according to the invention.

A further requirement to be met by primer coatings having a penetrative effect is their capability of ensuring good adhesion to paints subsequently applied onto the coated substrate and to provide a good anchorage between the paint and the substrate. This requirement must still be met even in the case where the paint is applied to primer layers of uneven thickness which may be due to irregular absorption of the substrate after many application of the primer.

This requirement was tested by applying about 12% dispersions having finest particle sizes according to the invention three times, separated by intermediate drying, on asbestos cement plates as substrate. After drying in air for three days, the primer coat was painted with a dispersion paint containing a styrene/butyl acrylate dispersion as binder and having a ratio of dispersion to pigment filler mixture of 1:1.6. A reinforcing cloth strip of polyethylene terephthalate was imbedded in the fresh paint and then painted with the same paint after drying of the first paint coat.

The adhesion between the primer coat and the substrate, and between the primer coat and the dispersion paint coat was tested by trying to remove the cloth strip. Good adhesion was found regardless of whether it was peeled off dry or wetted by storing under water and re-drying. The same results were obtained from tests performed according to Examples 1 to 6 with soft binder films which had adjustable monomer ratios, or with hard binder films of polymers. Without exception, the cloth strips could be pulled off the dispersion paint coating, leaving the lattice-type fabric structure embossed on the paint layer; however, no paint was taken off the substrate or the primer coat in this operation. The same results were obtained by cross-cutting the dried dispersion paint coating and trying to pull the dispersion paint film off the cross-cut squares by means of an adhesive tape. The paint layer did not come off either.

The following Examples illustrate the preparation of finely distributed dispersions of the invention.

EXAMPLE 1

A stable monomer emulsion is prepared from

| | | |
|---|---|---|
| styrene | 134 | parts by weight |
| butylacrylate | 200 | parts by weight |
| acrylamide | 4.5 | parts by weight |
| methacrylic acid | 12.0 | parts by weight |
| medium salt of a secondary alkyl-sulfonate ($C_{12}$—$C_{16}$) | 10 | parts by weight |
| reaction product of nonyl-phopol with 10–12 moles of ethylene oxide | 5.0 | parts by weight |
| water | 400 | parts by weight |

The emulsion is metered into a liquor of 230 parts by weight of water, 2 parts by weight of a non-ionic emulsifier and 8 parts by weight of an ionic emulsifier. Simultaneously to the dosage of the emulsion, a solution of 2 parts by weight of ammonium persulfate in 40 parts by weight of water is added.

The mean particle size of the dispersion adjusted to a pH of 8–9 is 0.036 microns.

EXAMPLE 2

Copolymer dispersions containing an optical brightener and having fine particles are obtained by dissolving additionally 0.1 part by weight of a vinyl-sulfonyl-pyrazoline brightener (cf. German Offenelegungsschrift No. 2,011,552) in the monomer mixture of Example 1, and subsequently preparing the plastics dispersions as before.

Both the aqueous plastics dispersion and the dry polymer film exhibit a characteristic blue fluorescence under UV radiation which allows detection of even very small polymer amounts in the different substrates. Fractionating by gel permeation chromatography shows that the optical brightener is incorporated uniformly in the polymer, i.e. no accumulations are formed in certain ranges of molecular weight. The average particle size of the copolymer dispersion containing the optical brightener is 0.038 microns.

EXAMPLE 3

A monomer mixture comprising

| | |
|---|---|
| styrene | 170 parts by weight |
| butylacrylate | 170 parts by weight |
| acrylamide | 4 parts by weight |
| methacrylic acid | 10 parts by weight | is metered into a liquor comprising 680 parts by weight of water, 25 parts by weight of a secondary sodium alkyl sulfonate ($C_{12}$–$C_{16}$) and 10 parts by weight of the reaction product of nonyl-phenol and from 8–12 moles of ethylene oxide.

A solution of 2 parts by weight of ammonium persulfate in 40 parts by weight of water is used as initiator. The average particle size diameter is 0.038 microns.

EXAMPLE 4

A stable monomer emulsion is prepared from

| | |
|---|---|
| styrene | 3600 parts by weight |
| butyl acrylate | 3600 parts by weight |
| acrylamide | 400 parts by weight |
| methacrylic acid | 250 parts by weight |
| sodium lauryl sulfate | 340 parts by weight |
| reaction product of nonyl-phenol with 8–12 moles of ethylene oxide | 180 parts by weight |
| water | 10,000 parts by weight |

The emulsion is metered into a liquor of 5000 parts by weight of water, 80 parts by weight of the non-ionic emulsifier and 280 parts by weight of the anionic emulsifier. A solution of 40 parts by weight of ammonium persulfate in 900 parts by weight of water is metered in simultaneously. The average particle diameter of the dispersion adjusted to a pH of 8–9 is 0.042 microns.

The dispersion can be concentrated in the same reaction vessel, under water jet vacuum, to a solids content of about 45%. The average particle size remains 0.042 µm.

EXAMPLE 5

A monomer mixture of

| | |
|---|---|
| methylmethacrylate | 130 parts by weight |
| butylaurylate | 200 parts by weight |
| acrylic acid | 12 parts by weight |

-continued

| | |
|---|---|
| acrylamide | 4 parts by weight | is metered into a liquor of 660 parts by weight of water, 20 parts by weight of sodium lauryl ethoxylate-sulfate (with 2-5 moles of ethylene oxide) and 8 parts by weight of a reaction product of nonyl-phenol and 6-10 moles of ethylene oxide. A solution of 3 parts by weight of potassium persulfate in 30 parts by weight of water is used as initiator. The average particle size is 0.041 microns.

EXAMPLE 6

The composition of the liquor is as in Example 5. The monomer mixture comprises

| | |
|---|---|
| methlmethacrylate | 100 parts by weight |
| butylacrylate | 230 parts by weight |
| acrylic acid | 13 parts by weight |
| acrylamide | 5 parts by weight |

2 parts by weight of potassium persulfate dissolved in 20 parts by weight of water are employed as initiator. The average particle diameter is 0.045 microns.

EXAMPLE 7

A stable monomer emulsion is prepared from

| | |
|---|---|
| styrene | 170 parts by weight |
| butylacrylate | 170 parts by weight |
| sodium lauryl sulfate | 15 parts by weight |
| reaction product of nonyl-phenol with 8-12 moles of ethylene oxide | 5 parts by weight |
| water | 450 parts by weight |

The emulsion is metered into a liquor consisting of 200 parts by weight of water, 3 parts by weight of the non-ionic emulsifier and 8 parts by weight of the ionic emulsifier. A solution of 3 parts by weight of ammonium persulfate in 30 parts by weight of water is simultaneously metered in.

The average particle size of the dispersion being adjusted to pH 8-9 is 0.060 microns.

COMPARATIVE EXAMPLE A

A copolymer dispersion is prepared comprising

| | |
|---|---|
| vinyl acetate | 70 parts by weight |
| Versatic®-10C-acid vinyl ester | 25 parts by weight |
| crotonic acid | 5 parts by weight | with an anionic emulsifier and an inorganic per-compound and containing from 40-50% of solids.
The average particle size is 0.620 microns.

COMPARATIVE EXAMPLE B

A copolymer dispersion is prepared according to Example A, consisting of

| | |
|---|---|
| consisting of | |
| vinyl acetate | 70 parts by weight |
| butylacrylate | 30 parts by weight. |

The average particle size is 0.270 microns.

COMPARATIVE EXAMPLE C

A copolymer dispersion is prepared, comprising

| | |
|---|---|
| styrene | 50 parts by weight |
| butylacrylate | 50 parts by weight |
| acrylic acid | 2 parts by weight |
| methacrylic acid | 5 parts by weight |
| acrylamide | 3 parts by weight | with a mixture of anionic and non-ionic emulsifiers and an inorganic per-compound.
The average particle size is 0.150 microns.

COMPARATIVE EXAMPLE D

A copolymer composed of

| | |
|---|---|
| vinyl acetate | 70 parts by weight |
| maleic acid dibutylester | 30 parts by weight | is dissolved in ethyl acetate to yield a 60% solution. The viscosity at 20° C. according to Höppler (DIN 53 015) is 80 P. a primer having penetrative effect is prepared from this solution in the following manner:

| | |
|---|---|
| 60% copolymer solution in ethyl acetate | 28 parts by weight |
| Shellsol A (trade mark) | 62 parts by weight |
| ethylglycol acetate | 10 parts by weight |

COMPARATIVE EXAMPLE E

From a copolymer comprising

| | |
|---|---|
| vinyl toluene | 85 parts by weight |
| acrylic acid-2-ethyl-hexyl ester | 15 parts by weight | having a viscosity of about 60 cP at 20° C. according to Höppler in a 30% solution in xylene, a primer coating solution is prepared in the following manner:

| | |
|---|---|
| copolymer | 170 parts by weight |
| white spirit | 545 parts by weight |
| Shellsol A (trade mark) | 285 parts by weight |

TABLE 1

| | Penetration test in quartz sand fillings | |  |
|---|---|---|---|
| Example | Average particle size (microns) (according to light scattering method) | core weight (g) after application of 2 ml of a 17% and 11% dispersion | |
| 1 | 0.036 | 12.3 | 13.6 |
| 2 | 0.038 | 11.8 | 12.5 |
| 3 | 0.038 | 12.1 | 12.8 |
| 4 | 0.042 | 10.5 | 11.9 |
| 5 | 0.041 | 11.3 | 11.9 |
| 6 | 0.045 | 11.1 | 11.5 |
| 7 | 0.060 | 10.5 | 11.0 |
| Comparative Examples | | | |
| A | 0.620 | 0.6 | 1.1 |
| B | 0.270 | 3.4 | 3.8 |
| C | 0.150 | 6.0 | 6.4 |
| D | — | 10.8 | 11.0 |
| E | — | 10.4 | 11.2 |

What is claimed is:

1. A process for the preparation of finely particulate plastics dispersions particularly suitable for the solidifying primer coating of substrates to be painted, which comprises metering a monomer mixture containing
   I. from 20 to 80% by weight of monomer selected from styrene, methylmethacrylate and mixtures thereof as hardening component, provided that methyl methacrylate, if present, does not exceed 15% by weight of said mixture,
   II. from 20 to 80% by weight of monomer selected from acrylic acid and methacrylic acid esters of linear and branched alcohols having from 2 to 8 carbon atoms and mixtures thereof as plasticizing component,
   III. from 0.1 to 5% of an amide of an $\alpha,\beta$-unsaturated carboxylic acid, and
   IV. from 0.1 to 5% of an $\alpha,\beta$-unsaturated monocarboxylic acid, in the form of the pure monomer mixture or a preliminary emulsion, simultaneously with an initiator, into an aqueous liquor containing from 0.5 to 10% by weight of an anionic emulsifier, said monomers being used in such an amount that the solids content of the final dispersion does not exceed 45% by weight, polymerizing said monomers in said aqueous liquor to form said dispersion, and adjusting said dispersion to a pH of 7 to 10.

2. Plastics dispersions having a mean particle size of from 0.01 to 0.06$\mu$, obtained according to the process as claimed in claim 1.